US006391440B1

(12) United States Patent
Yoshino et al.

(10) Patent No.: US 6,391,440 B1
(45) Date of Patent: May 21, 2002

(54) RECORDING MEDIUM AND IMAGE FORMATION AND PRINT EMPLOYING THE MEDIUM

(75) Inventors: Hitoshi Yoshino, Zama; Kenji Shinjo, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,050

(22) Filed: Feb. 22, 2000

(30) Foreign Application Priority Data

Feb. 23, 1999 (JP) .......................................... 11-045431

(51) Int. Cl.[7] ............................... B32B 3/00; B41J 2/01

(52) U.S. Cl. ....................... 428/342; 428/211; 428/341; 428/500; 428/532; 427/151; 503/209; 503/221; 347/103; 347/105

(58) Field of Search ................................ 428/195, 211, 428/500, 532, 341, 342; 427/151; 347/103, 105; 503/209, 221

(56) References Cited

U.S. PATENT DOCUMENTS

| | | | | | |
|---|---|---|---|---|---|
| 3,833,400 | A | | 9/1974 | Matsukawa et al. | 117/36.2 |
| 4,269,891 | A | | 5/1981 | Minagawa | 428/335 |
| 4,503,118 | A | | 3/1985 | Murakami et al. | 428/323 |
| 4,723,129 | A | | 2/1988 | Endo et al. | 346/1.1 |
| 4,770,934 | A | | 9/1988 | Yamasaki et al. | 428/331 |
| 4,791,094 | A | | 12/1988 | Sano et al. | 503/209 |
| 5,043,238 | A | * | 8/1991 | Monbaliu et al. | 430/59 |
| 5,302,427 | A | | 4/1994 | Murschall et al. | 428/34.2 |
| 5,445,868 | A | | 8/1995 | Harasawa et al. | 428/206 |
| 5,657,064 | A | | 8/1997 | Malhotra | 347/105 |
| 5,670,249 | A | | 9/1997 | Tanuma | 428/304.4 |
| 5,693,410 | A | | 12/1997 | Malhotra et al. | 428/216 |
| 5,752,009 | A | | 5/1998 | Nakahara et al. | 395/500 |
| 5,908,723 | A | * | 6/1999 | Malhotra et al. | 430/31 |
| 6,000,793 | A | | 12/1999 | Inamoto | 347/101 |
| 6,210,816 | B1 | * | 4/2001 | Malhotra | 428/690 |

FOREIGN PATENT DOCUMENTS

| | | | |
|---|---|---|---|
| EP | 0 782 932 | A1 | 7/1997 |
| JP | 54-59936 | | 5/1979 |
| JP | 55-5830 | | 1/1980 |
| JP | 55-51583 | | 4/1980 |
| JP | 55-144172 | | 11/1980 |
| JP | 56-148583 | | 11/1981 |
| JP | 57-87987 | | 6/1982 |
| JP | 58-70800 | | 4/1983 |
| JP | 58-76599 | | 5/1983 |
| JP | 60-232990 | | 11/1985 |
| JP | 61-146591 | | 7/1986 |
| JP | 62-158084 | | 7/1987 |
| JP | 1-18684 | | 1/1989 |
| JP | 1-36479 | | 2/1989 |
| JP | 1-36480 | | 2/1989 |
| JP | 1-115677 | | 5/1989 |
| JP | 2-276670 | | 11/1990 |
| JP | 5-221115 | | 8/1993 |
| JP | 6-93597 | | 4/1994 |
| JP | 6-183133 | | 7/1994 |
| JP | 6-240154 | | 8/1994 |
| JP | 6-286297 | | 10/1994 |
| JP | 6-316145 | | 11/1994 |
| JP | 7-68919 | | 3/1995 |
| JP | 7-78187 | B2 | 8/1995 |
| JP | 7-78188 | B2 | 8/1995 |
| JP | 7-314881 | | 12/1995 |
| JP | 7-314882 | | 12/1995 |
| JP | 7-314883 | | 12/1995 |
| JP | 8-6057 | B2 | 1/1996 |
| JP | 8-25796 | | 1/1996 |
| JP | 8-26259 | B2 | 3/1996 |
| JP | 8-118791 | | 5/1996 |
| JP | 8-150773 | | 6/1996 |
| JP | 8-164664 | | 6/1996 |
| JP | 8-169172 | | 7/1996 |
| JP | 8-174988 | | 7/1996 |
| JP | 8-174991 | | 7/1996 |
| JP | 8-238839 | | 9/1996 |
| JP | 9-254526 | | 9/1997 |
| JP | 9-295496 | | 11/1997 |
| JP | 9-309265 | | 12/1997 |
| JP | 10-217600 | | 8/1998 |
| JP | 10-250219 | | 9/1998 |
| JP | 10-264501 | | 10/1998 |

* cited by examiner

*Primary Examiner*—Cathy Lam
(74) *Attorney, Agent, or Firm*—Fitzpatrick, Cella, Harper & Scinto

(57) ABSTRACT

A recording medium comprises one or more of the compounds represented by General Formula (1) and/or General Formula (2):

(1)

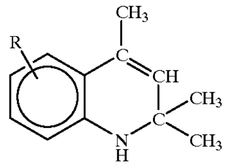

wherein R is any of a hydrogen atom, a substituted or unsubstituted alkokyl group, a substituted or unsubstituted alkyl group, and a substituted or unsubstituted aryl group;

(2)

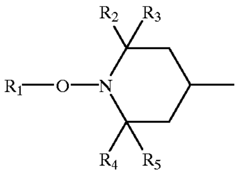

wherein $R_1$ is an alkyl group of 1 to 20 carbons, and $R_2$, $R_3$, $R_4$, and $R_5$ are respectively independently an alkyl group of 1 to 3 carbons.

6 Claims, No Drawings

RECORDING MEDIUM AND IMAGE FORMATION AND PRINT EMPLOYING THE MEDIUM

BACKGROUND OF THE INVENTION

Field of the Invention

The present invention relates to a recording medium suitable for recording with an ink. The present invention relates also to an image formation method and a printed matter employing the above recording medium. In particular, the present invention relates to an ink-jet recording medium which gives image of high optical density and sharp color tone without causing yellowing of a white area or discoloration of a printed image; and an image formation method and a printed matter employing the above recording medium.

The ink-jet recording systems conduct recording of picture images and characters by ejecting fine ink droplets onto a recording medium like a paper sheet. The ink-jet recording system has features of high speed printing with low noise, ease of multicolor printing, flexibility in record pattern, needlessness of development and fixation of images, and so forth. Therefore, ink-jet recording systems have come to be employed widely for image information recording and other application fields. Furthermore, the image formed by a multicolor ink-jet system can be comparable to the images formed by multicolor gravure printing or color photography, and is less costly in preparing a small number of print copies, so that the ink-jet recording systems are coming to be employed also in full color recording.

In ink-jet recording, the recording apparatuses and the recording methods have been improved for a higher recording speed, higher fineness, and full-color printing. On the other hand, the recording medium therefor is required to have higher level of properties. Specifically, the recording medium is required to form an image of clear and sharp color tone with higher printed dot density, to absorb ink quickly and have a large absorption capacity not to cause flow-out or running of the ink even with overlapping of printed dots, to cause little diffusion of the printed dots in lateral direction, to give printed dots of precise circle shape with smooth periphery without blurring, and to have high whiteness to give high contrast of the printed dots.

Hitherto, various trials have been made to meet the above requirements. For example, an inorganic pigment is applied, with a binder if necessary, onto the surface of the substrate, or is incorporated into the substrate. JP-A-55-5830 (the term "JP-A" herein means a "Japanese Patent Application Laid-Open No.") discloses an ink-jet recording paper sheet having an ink-absorbent coating layer provided on the surface of the supporting member. JP-A-55-51583 and JP-A-62-158084 disclose a recording sheet coated with or internally containing amorphous silica or a salt thereof, or a mixture thereof. JP-A-55-144172 discloses a coat layer containing an ink-absorbent pigment such as zeolite. JP-A-56-148583 discloses a coat layer composed of fine powdery silicate and a water-soluble resin. JP-A-60-232990 discloses a coat layer containing cationic alumina hydrate. JP-A-2-276670 discloses a recording sheet containing pseudo-boehmite.

However, the recording mediums containing an inorganic pigment as above are liable to be yellowed at an unprinted area or a white ground under a certain conditions, or to cause discoloration or fading of the recorded image by the action of ozone or light. Use of a pigment of a larger specific surface area will improve remarkably the color development, but tends to facilitate discoloration of a white ground or fading of images.

On the other hand, various investigations have been made for prevention of discoloration of an unprinted or a white ground and fading of an image, for example, as below. JP-A-09-309265 discloses a recording medium containing a metal component of Group 2 and amorphous or fine laminar crystalline silica. JP-A-57-87987 discloses a recording medium containing a specified metal oxide such as phosphotungstate and phosphomolybdate, or a specified metal chloride such as chromic chloride. This disclosure intends in principle to retard the reactivity of the inorganic pigment by covering with the metal component the reactive sites such as acid points of the inorganic pigment. However, the added metal compound may cause change of the color tone or bronzing of the recorded image, so that the disclosed recording medium is not sufficiently effective in prevention of fading in ozone exposure.

JP-A-05-221115 discloses a recording medium containing starch particles, an ethylene-vinyl acetate copolymer, and a cationic dye-fixing agent. JP-A-06-183133 discloses a recording medium containing starch particles and cationic aluminum oxide. These disclosures intend in principle to prevent yellowing of the recording medium by addition of the starch particles. However, the added starch particles may lower the ink absorbency or may facilitate migration of the printed dye.

JP-A-01-18684 discloses a recording medium containing an undecane type compound of a specified structure. JP-A-01-36479 discloses a recording medium containing a thioether type compound of a specified structure. JP-A-01-36480 discloses a recording medium containing a phenol type compound of a specified structure. JP-A-01-115677 discloses a recording sheet containing synthetic silica having a BET specific surface area of not less than 100 $m^2/g$ and a thioether. JP-A-06-286297 discloses a recording medium containing a polyvalent chain carboxylic acid. JP-A-06-316145 discloses a recording medium containing an organic acid having an aromatic nucleus.

JP-A-07-68919 discloses a recording medium containing a UV absorber, an antioxidant, a light quencher, or the like. JP-A-07-314881 discloses a recording medium containing a urea derivative, a semicarbazide derivative, a carbohydrazide derivative, or the like. JP-A-07-314882 discloses a recording medium containing a dithiocarbamic acid, a thiuram salt, a thiocyanate ester, a thiocyanate salt, a hindered amine, or the like. JP-A-07-314883 discloses a recording medium containing a thiourea derivative, a thiosemicarbazide derivative, thiocarbohydrazide derivative, or the like. JP-A-08-25796 discloses a recording medium containing a compound selected from thiourea derivatives, thiosemicarbazide derivatives, and thiocarbohydrazide derivatives, and a substance selected from iodine, iodides, dithiocarbamic acids, thiocyanate salts, and thiocyanate esters.

JP-A-08-118791 discloses a recording medium having an ink-receiving layer containing an inorganic pigment having a BET specific surface area of not less than 100 $m^2/g$ and an adhesive and containing a phosphorus type antioxidant. JP-A-08-150773 discloses a recording medium having an ink-receiving layer containing an inorganic pigment having a BET specific surface area of not less than 100 $m^2/g$ and an adhesive and containing ascorbic acid or erisorbic acid, or a derivative thereof. JP-A-08-164664 discloses a recording medium having an ink-receiving layer containing an inorganic pigment having a BET specific surface area of not less than 100 $m^2/g$ and an adhesive and containing cycloamylose to fix 20% or more of the surface area of the inorganic pigment.

Any of the aforementioned methods prevents, in principle, the oxidation deterioration of coloring matter component of the printed image by incorporation of an antioxidant into the recording medium. However, the added antioxidant itself may become colored, or addition of the antioxidant in an amount effective to prevent color-facing may impair the ink absorbency or may cause ink repulsion. Otherwise, the antioxidant itself may deteriorate with lapse of time and may deposit on the surface of the recording medium, or may disappear from the recording medium by sublimation or a like process. A highly reactive antioxidant may shorten the duration of the fading-prevention effect. Further the addition of the antioxidant may cause exudation of odor from the recording medium. Some of the antioxidants are less soluble in a solvent, and cannot readily be added to the recording medium in a necessary amount.

JP-A-08-169172, JP-A-08-174988, and JP-A-08-174991 disclose respectively a recording medium constituted of a neutralized paper sheet containing calcium carbonate as a filler and an alkylketene dimer or an alkenylsuccinic anhydride as an internal sizing agent, and additionally a copolymer of a polymerizable vinyl compound bonded to a quaternary ammonium base and another polymerizable vinyl compound bonded to a UV-absorbing structure unit incorporated therein. JP-A-06-93597 discloses a recording medium containing a fluorescent whitener of a specified structure and a nonanol type penetrating agent or a nonylphenol type penetrating agent. JP-A-10-217600 discloses a recording medium containing a cationic compound of a specified structure. These disclosures intend, in principle, to prevent fading by addition as an essential component of a quaternary ammonium salt combined with a UV-absorbing structure unit to a paper medium, or by addition of a specified substance to a recording medium. However, such a material added thereto may lower the coloring matter fixability or may fail in simultaneous prevention of fading and discoloration of a white ground.

Still further methods are disclosed. JP-A-06-240154 discloses a recording medium comprising a composition containing a polyamine and an oxygen acid of phosphorus, an oxy-acid, or a derivative thereof. JP-A-09-254526 discloses an ink-receiving layer comprising an inorganic sol and a binder resin, in which the binder resin contains a metal alcoholate and a polysiloxane polymer containing an organosiloxane, and an organopolysiloxane polymer as essential components. JP-A-10-264501 discloses a recording medium having an ink-receiving layer comprising a pigment and a hydrophobic thermoplastic resin having a density of not lower than 1.1 g/$cm^3$.

However, any of the above methods cannot completely prevent the discoloration of the recording medium and fading of the image under various environmental conditions.

As described above, the application fields of the ink-jet recording are extending remarkably. With the diversification of the application of the ink-jet recording, oil-based inks have come to be used in place of the conventional aqueous inks. Otherwise, a common document form like borders is printed by graphic art or other conventional method, and variable individual matters are printed by ink-jet recording. In such cases, an oily non-aqueous solvent is contained in the recording medium, and it tends to cause discoloration (yellowing) of an unprinted area or a white ground. The image formed by combined use of an oil-based dye and an aqueous dye tends to discolor or fade with lapse of time, or liable to cause feathering of the image.

SUMMARY OF THE INVENTION

An object of the present invention is to provide a recording medium which solves the aforementioned problems of the prior arts, and is useful for ink-jet recording to form an image with high ink absorbency with high optical density of printed portions of the image without causing fading of the image or discoloration (yellowing) of the recording medium in a variety of temperature and humidity environments.

The recording medium of the present invention comprises one or more of the compounds represented by General Formula (1) and/or General Formula (2):

(1)

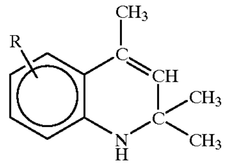

wherein R is any of a hydrogen atom, a substituted or unsubstituted alkoxyl group, a substituted or unsubstituted alkyl group, and a substituted or unsubstituted aryl group;

(2)

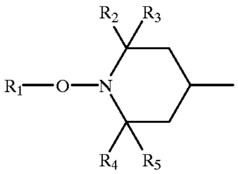

wherein $R_1$ is an alkyl group of 1 to 20 carbons, and $R_2$, $R_3$, $R_4$, and $R_5$ are respectively independently an alkyl group of 1 to 3 carbons.

The present invention also provides an image forming method by ink-jet recording by ejecting fine droplets of an ink through a fine nozzle to deposit the ink onto a recording medium, wherein the recording medium having the above constitution is employed.

The present invention further provide a printed matter having an image formed on the aforementioned recording medium.

DETAILED DESCRIPTION OF THE PREFERRED EMBODIMENTS

After comprehensive investigation to solve the aforementioned problems of the prior arts, it was found by the inventors of the present invention that incorporation of the cyclic nitrogen-containing compound represented by General Formulas (1) and/or (2) prevents discoloration of a white ground of a recording medium, or fading of an printed image. Thereby the present invention has been accomplished. The recording medium of the present invention has high ink absorbency and gives high optical density to a printed portion, and causes no feathering of the image, no fading or no discoloration of the image with lapse of time, and no discoloration of the white ground of the recording medium even when the image is formed with combined use of an aqueous ink and an oil-based ink.

The present invention is described below in detail.

The recording medium of the present invention is characterized in that it contains at least one cyclic nitrogen-containing compound represented by General Formulas (1) or (2). The recording medium of the present invention may be constituted of a fibrous material like a paper sheet, or may be constituted of a substrate and an ink-receiving layer formed thereon like a coated paper sheet or a coated film. The ink-receiving layer provided on the substrate may have a structure not having a definite layer but having a structure such that a small or extremely small amount of a coating material containing a pigment or a resin is applied on and near the surface of a substrate or a fibrous material. Otherwise, the ink-receiving layer may have a structure such that the coating material covers the substrate surface and vicinity thereof. In the structure of the recording medium in which the ink-receiving layer is provided on a substrate, the compound represented by General Formula (1) or (2) should be contained in at least one of the substrate or the ink-receiving layer.

Further, it was found by the inventors of the present invention that discoloration or fading of a formed image or discoloration of the recording medium is prevented more effectively when an inorganic pigment is contained in addition to the cyclic nitrogen-containing compound represented by General Formula (1) or (2). In particular, a fine particulate inorganic pigment having a specific surface area larger than 100 $m^2/g$ gives significant effect. In the recording medium constituted of a fibrous material, the inorganic pigment may be added as a filler as usual. In the recording medium having an ink-receiving layer formed on a substrate, the inorganic pigment may be incorporated into the ink-receiving layer.

The materials for constituting the recording medium of the present invention is described below.

Firstly, the compound represented by General Formula (1) as an essential component is explained:

(1)

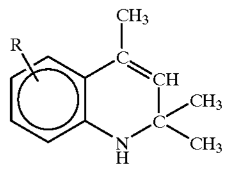

wherein R is any of a hydrogen atom, a substituted or unsubstituted alkoxyl group, a substituted or unsubstituted alkyl group, and a substituted or unsubstituted aryl group.

Any of 1,2-dihydro-2,2,4-trimethylquinoline and derivatives thereof is useful in the present invention. In particular, the compound is preferred which has the R group in General Formula (1) selected from a hydrogen atom, alkoxyl groups of 1 or 2 carbons, alkyl groups, substituted alkyl groups (R'—CONH—R"—, XR"—, HOOC—R"—, R'—NH—R"—, R'—CONH—R"—NH—R'"— (where X is a halogen atom, R' is a hydrogen atom or an alkyl group, R" and R'" are an alkyl group independently)), aryl groups, and substituted aryl groups.

According to the investigation of the inventors of the present invention, the cyclic nitrogen-containing compound represented by General Formula (1) contained in a recording medium prevents discoloration (yellowing) of a white ground or unprinted area of the recording medium or discoloration or fading of a formed image, even when an image is formed with combination of an oil-based ink and an aqueous ink and the both inks are existing in the recording medium. The recording medium containing the above cyclic nitrogen-containing compound has high ink absorbency and satisfactory color developability, and is capable of giving high resolution of the formed image without beading.

In constituting the recording medium of the present invention, among the compound represented by General Formula (1), particularly preferred are the ones having an alkoxyl group of 1 or 2 carbons. The more suitable cyclic nitrogen-containing compound in constituting the recording medium of the present invention specifically includes 6-ethoxy-1,2-dihydro-2,2,4-trimethylquinoline, and a polymer of 2,2,4-trimethyl-1,2-dihydroquinoline.

The nitrogen-containing compound represented by General Formula (1) may be contained as a dimer, or a trimer, or in a higher association state or as a polymer or condensate thereof in the recording medium of the present invention. Otherwise, the compound represented by General Formula (1) may be contained in a bonded state with another constituent material such as a pigment in the recording medium. Such a bonded or associated state of the compound represented by General Formula (1) is favorable in the recording medium of the present invention, since the compound represented by General Formula (1) in the associated or bonded state is less liable to sublime and emit odor on heating of the recording medium, so that the effects of prevention of discoloration and prevention of discoloration and yellowing of the printed image are maintained even in high-temperature environment for a long term.

In another aspect of the present invention, the recording medium is characterized in that it contains the compound represented by General formula (2) solely or in combination with the cyclic nitrogen-containing compound represented by the above General Formula (1):

(2)

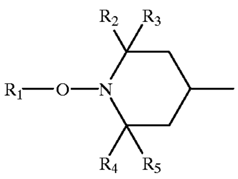

where $R_1$ is an alkyl group of 1 to 20 carbons, and $R_2$, $R_3$, $R_4$, and $R_5$ are respectively independently an alkyl group of 1 to 3 carbons.

The cyclic nitrogen-containing compound represented by the above General Formula (2) constituting the recording medium of the present invention may be any hindered amine compound. $R_1$ in General formula (2) is an alkyl group of 1 to 20 carbons and more preferably, the cyclic nitrogen compound having an alkyl group $R_1$ of 8 to 16 carbons is contained in the recording medium. The compound having the alkyl group $R_1$ within this carbon number range prevents effectively the discoloration or yellowing of a white ground or an unprinted portion of the recording medium, and prevents effectively discoloration or fading of the formed image, even when an image is formed by combined use of an oil-based ink and an aqueous ink on the recording medium. The above recording medium has high ink absorbency and satisfactory color developability, and gives high resolution of the formed image without beading.

In the above General Formula (2), $R_2$, $R_3$, $R_4$, and $R_5$ are respectively independently an alkyl group of 1 to 3 carbons. More preferably, $R_2$, $R_3$, $R_4$, and $R_5$ are independently methyl or ethyl. The compound incorporated into the recording medium prevents effectively ink repulsion without impairing ink absorbency, and prevents effectively possible bronzing of the printed image possibly occurring in storage at a high temperature for a long term. Incidentally, the term "ink repulsion" means the phenomenon that an ink deposited on a recording medium is not absorbed and uncolored portions appear in a solid printed area.

The most suitable compound represented by General Formula (2) constituting the recording medium of the present invention is exemplified by Tinuvin 123 (trade name, Ciba Specialty Co.).

The compound represented by General Formula (2) may be contained as a dimer, a trimer, or in a higher association state, or as a polymer or a condensate in the recording medium of the present invention, or may be contained therein in a bonded state with another constituent material such as a pigment in the recording medium, similarly as the compound represented by General Formula (1). Such a bonded or associated state of the compound represented by General Formula (2) is favorable in the recording medium of the present invention, since the compound represented by General Formula (2) in the associated or bonded state is less liable to sublime and emit odor on heating of the recording medium, so that the effects of prevention of discoloration and prevention of discoloration and yellowing of the printed image are maintained even in high-temperature environment for a long term. This is a favorable embodiment of the recording medium of the present invention.

JP-A-58-76599 and JP-A-58-70800 describe a bacterium-resistant paper containing an oxyquinoline or an oxyquinoline derivative and a humic acid compound added to the pulp. However, these publications describe only 8-oxyquinoline as the quinoline compound, not mentioning the compound represented by General Formula (1) of the present invention. The publications show the effect of bacterium resistance of the compound, but do not describe at all the effects of prevention of discoloration of a white ground, or prevention of discoloration and fading of a printed image which are achieved by the recording medium of the present invention.

JP-A-8-238839 discloses a recording sheet comprising a base material and an additive such as a quinoline compound. The quinoline compound described are quinoline, hydroxyquinoline, aminoquinoline, quinoline carboxylic acid, dimethylquinoline, trimethylquinoline, isoquinoline, and so forth, not including the compound specified by General Formula (1) which is the essential constituent of the recording medium of the present invention. The publication shows the effects of shortening of drying time in microwave irradiation and improvement of optical density of the printed image, but does not describe at all the effects of prevention of discoloration or yellowing of a white ground, or prevention of discoloration and fading of a printed image which are achieved by the recording medium of the present invention.

According to the investigation by the inventors of the present invention, out of the quinoline compounds, only the compound represented by General Formula (1) of the present invention added to the recording medium can achieve the effects of prevention of discoloration or yellowing of a white background and prevention of fading of a printed image in image formation with combined use of an oil-based ink and an aqueous ink.

JP-A-61-146591 discloses a recording medium containing a hindered amine type compound having in the molecule one or more hindered amine moieties of a specified structure; containing specifically 4-benzoyloxy-2,2,6,6-tetramethyl-piperidine, and the like. However it does not disclose the compound represented by General Formula (2) employed as the essential constituent of the recording medium of the present invention. The publication shows the effects in lightfastness and water-resistance of a formed image, but does not describe at all the effects of prevention of discoloration of a white ground, or prevention of discoloration and fading of a printed image which are achieved by the recording medium of the present invention.

JP-A-9-295496 discloses a printed matter prepared by thermal diffusion transfer of an image formed with a disperse dye onto a separate image receiving layer and forming two overcoat layers thereon containing a transparent resin, the second overcoat layer containing Tinuvin 123, a hindered amine. In the disclosed printed matter, however, the ink-receiving layer is entirely covered with the two-layered overcoat composed of the transparent resin, and the hindered amine is enclosed in the transparent resin. Therefore it cannot directly affect the coloring matter. This constitution is different from the constitution of the present invention in which the compound is incorporated in the recording medium. In the disclosure, the hindered amine improves lightfastness. The publication does not describe at all the effects of prevention of discoloration of a white ground, or prevention of discoloration and fading of a printed image which are achievable by the recording medium of the present invention.

JP-A-8-238839 discloses a recording sheet comprising a base material and an additive such as a piperidine compound, the piperidine compound specifically including piperidinomethanol, and 4-piperinopiperidine. However, the publication does not describe at all the compound represented by General Formula (2) of the present invention. The publication shows the effects of shortening of drying time in microwave irradiation and improvement of optical density of the printed image, but does not describe at all the effects of prevention of discoloration of a white ground, or prevention of discoloration and fading of a printed image, which are achievable by the recording medium of the present invention.

According to the investigation by the inventors of the present invention, out of the hindered amine compounds, only the compound represented by General Formula (2) of the present invention added to the recording medium can achieve the effects of prevention of discoloration of a white ground and prevention of fading of a printed image in image formation with combined use of an oil-based ink and an aqueous ink. More specifically, only the compounds in which the alkyl group is bonded to nitrogen of the piperidine ring with interposition of oxygen is found to be effective. The compound of this structure is not described in the prior art publication.

The recording medium of the present invention contains one or more of the compounds represented by General Formula (1) and/or General Formula (2), and preferably an inorganic pigment additionally. As described before, in the recording medium constituted of a fibrous material, the inorganic pigment may be added as a filler for opacity as usual, or in the recording medium having an ink-receiving layer formed on a substrate, the inorganic pigment may be incorporated into the ink-receiving layer.

The above inorganic pigment may be any material conventionally incorporated into paper, or applied for coating a paper sheet or a film. For example, the pigment includes calcium carbonate, kaolin, clay, talc, calcium sulfate, barium sulfate, titanium dioxide, zinc oxide, zinc sulfide, titanium white, silica, silica-alumina, diatomite, calcium silicate, magnesium silicate, magnesium carbonate, magnesium hydroxide, colloidal silica, synthetic silica, cationic silica, alumina, aluminum oxide, aluminum hydroxide, alumina hydrate, pseudo-boehmite, lithopone, zeolite, and hydrated halloysite. One or more inorganic pigments are selected as necessary.

Of these inorganic pigments, preferred are silicas such as colloidal silica, synthetic silica, and cationic silica; aluminum oxides such as pseudo-boehmite; aluminum hydroxide; and alumina hydrate.

The pigment added in the recording medium improves the color saturation of the printed image to give clear images.

The aforementioned inorganic pigment to be incorporated into the recording medium of the present invention has preferably a BET specific surface area not less than 50 $m^2/g$. With such a pigment, the color development of the printed image is improved, and the optical density is further increased. More preferably in the present invention, the pigment has a BET specific area of not less than 100 $m^2/g$. With such a pigment, the color saturation of the formed image is further improved to form a clearer image.

Into the recording medium of the present invention, a further additive may be incorporated in addition to the above inorganic pigment. The additive may be selected suitably from metal oxides, salts of a divalent or higher-valent metal, and cationic organic substances, and the like. Specifically, the additive includes metal oxides such as silica, silica-alumina, boria, silica-boria, magnesia, silica-magnesia, titania, zirconia, and zinc oxide, hydroxides; salts of divalent or higher-valent metals such as calcium carbonate, barium sulfate, halide salts including magnesium chloride, calcium bromide, calcium nitrate, calcium iodide, zinc chloride, zinc bromide, and zinc iodide; kaolin; talc; and cationic organic substance such as quaternary ammonium salts, polyamines, and alkylamines. The additive is used in an amount preferably of not more than 20% by weight of the inorganic pigment incorporated into the recording medium.

The embodiments of the recording medium of the present invention are classified into two types: (I) the compound represented by the aforementioned General Formula (1) and (2) is incorporated into a fibrous material like pulp; and (II) an ink-receiving layer is formed on a substrate, and the compound represented by the aforementioned General Formula (1) and/or (2) is incorporated into at least one of these. The embodiments are explained below.

The recording medium of the first embodiment of the present invention is constituted by adding an inorganic pigment as mentioned above into a fibrous material. The cellulose pulp for formation of the fibrous material is not specially limited. The useful cellulose pulp is produced from hardwood or softwood, the pulp including chemical pulp such as sulfite pulp (SP), alkali pulp (AP), kraft pulp (KP); semichemical pulp; semimechanical pulp; mechanical pulp; and waste paper pulp which is deinked secondary fiber. The pulp may be unbleached pulp, bleached pulp, beaten pulp, or unbeaten pulp. Non-wood pulp is also useful as the cellulose pulp, including fiber of grasses, leaves, shells, and seed coats, such as straw, bamboo, hemp, bagasse, kenaf, paper bush, cotton linter, and the like. Synthetic fibers which are hydrophilic are also useful, including regenerated fiber like rayon, cellulose derivative fiber, hydrophilic synthetic fiber like polyvinylalcohol fiber and polyacrylamide fiber.

The inorganic pigment can be incorporated into cellulose fiber by making a fiber sheet from a mixture of cellulose pulp dispersion and the inorganic pigment. Further, a usual filler may be added further.

The production of the recording medium of the above embodiment of the present invention can be conducted by a conventional paper-making process. The paper machine may be a Fourdrinier paper machine, a cylinder paper machine, round trunk, a twin wire machine, or the like. Multiply sheet formation can be conducted by a combination paper machine, in which a single head box for multiply sheet making is preferably employed and the paper stocks for the respective layers are fed from stock inlets in parallel to form laminar paper layers. This method is particularly preferred, since the paper stocks are suitably mixed at the interface between the respective paper layers to increase the strength in the z direction.

In production of the recording medium of the present invention, a paper strength-improving agent, a retention aid, or a colorant may be additionally used, if necessary. The retention aid includes cationic retention aids such as cationic starch, dicyandiamide-formalin condensates; anionic retention aids such as anionic polyacrylamides; and combination thereof. Further, starch may be used for size pressing, or calender roll may be used for smoothening the surface.

In the above method, the amount of addition of the inorganic pigment is not limited, but ranges preferably from 0.1% to 50% by weight based on the dry matter of the recording medium for the ink absorbency and the color developability. More preferably, the amount ranges from 1% to 20% by weight for decreasing powder fall on repeated rubbing of the recording medium surface.

The basic weight of the entire recording medium is not specifically limited unless the recording medium is not extremely thin or thick, but preferably ranges from 40 to 300 $g/m^2$ in consideration of deliverability in printing with a printer. More preferably the basis weight ranges 60 to 200 $g/m^2$ to obtain suitable folding endurance and high opacity. With the above constitution, many printed sheets can be piled without sticking of the sheets.

The recording medium of the second embodiment of the present invention is constituted of a substrate made of various materials and an ink-receiving layer containing an inorganic pigment formed on the substrate.

The substrate is not limited specially. The substrate includes paper sheets such as sized paper sheets, unsized paper sheets, coated paper sheets, and resin-coated paper sheets using resins such as polyethylene; sheet-shaped material such as thermoplastic films; cloths; glass plates; and metal plates. The thermoplastic film includes transparent films of polyester, polystyrene, polyvinyl chloride, polymethyl methacrylate, cellulose acetate, polyethylene, polycarbonate, and the like, and also opaque sheet of the thermoplastic film made opaque by an inorganic filler or fine foams.

The ink-receiving layer containing the pigment can be formed on a substrate made of an arbitrary material by application of a coating liquid containing the pigment and a binder. The pigment may be suitably selected from the aforementioned inorganic pigments. The binder can be selected arbitrarily from water-soluble polymers, including polyvinylalcohol and modifications thereof (cation-modified, anion-modified, and silanol-modified); starch and modifications thereof (oxidized, and etherified); gelatin and modifications thereof; casein and modifications thereof; carboxymethylcellulose; gum arabic; cellulose derivatives such as hydroxyethylcellulose, and hydroxypropylmethylcellulose; conjugated diene type copolymer latexes such as SBR latexes, NBR latexes, and methyl methacrylate-butadiene copolymer latexes; functional group-modified polymer latexes; vinyl copolymer latexes such as ethylene-vinyl acetate copolymer latexes; polyvinylpyrrolidone; maleic anhydride copolymers; and acrylic acid ester copolymers. The binder may be used singly or in combination of two or more thereof. The mixing ratio of the alumina hydrate to the binder ranges preferably from 1:1 to 30:1, more preferably from 5:1 to 25:1. Within this range, the ink absorbency is satisfactory, and cracking or powder falling of the ink-receiving layer is prevented.

The ink-receiving layer can be formed on a substrate by applying a dispersion solution containing the aforementioned pigment and a binder on the substrate by a coating machine and drying it. The coating may be conducted by a coating machine such as a blade coater, an air knife coater, a roll coater, a brush coater, a curtain coater, a bar coater, a gravure coater, and a sprayer. The amount of the coating ranges preferably from 0.5 to 60 $g/m^2$, more preferably from 5 to 45 $g/m^2$ based on the dry matter. After the coating, the obtained recording medium may be treated by a calendar roll or a like apparatus for improving surface smoothness of the ink-receiving layer, if necessary.

As described above, the recording medium of the first constitution or the second constitution of the present invention is required to contain the compound represented by General Formula (1) or (2). This compound may be added in any of the steps in formation of the recording medium. For example, the compound represented by General Formula (1) or (2) may be added to a paper-making material or a coating liquid for formation of the ink-receiving layer. The compound represented by General Formula (1) or (2) may be added to a pigment before recording medium production. Otherwise the compound represented by General Formula (1) or (2) may be added onto a recording medium formed by a paper-making process or onto a recording medium having an ink-receiving layer. Any of the above methods may be employed. Preferably, a solution of the compound represented by General Formula (1) or (2) in a solvent like acetone is applied onto the recording medium by coating or a like method, and the solvent is vaporized by drying. The applied solution of the compound represented by General Formula (1) or (2) is preferably dried at a possible lowest temperature for obtaining a recording medium achieving the effects of the present invention., The recording medium of the present invention is not limited, provided that it contains the compound represented by General Formula (1) or (2). The amount of addition thereof is preferably in the range from 0.01% to 10% by weight of the pigment constituting the recording medium for ink absorbency and prevention of fading of the image. More preferably, the amount is in the range from 0.1% to 10% by weight of the pigment. In this range, feathering and beading of the image can be effectively prevented. In the present invention, the term "feathering" means spreading of the area of a solid print portion colored by a coloring matter like a dye, and the term "beading" means granular irregularity of image density caused by coalescence of ink droplets in a solid print portion.

The image-forming method of the present invention is described below. The image-forming method of the present invention is characterized in that ink droplets are ejected through a fine orifice to deposit the ink onto a recording medium of the present invention described above. The ink used is preferably an aqueous ink composed mainly of a coloring matter (dye or pigment), a water-soluble organic solvent, and water. The dye is preferably a water-soluble dye, including direct dyes, acid dyes, basic dyes, reactive dyes, and food dyes. Any dye may be used, provided that it is capable of forming an image satisfying the properties of dye fixability, color developability, image sharpness, stability, lightfastness, and so forth in combination of the recording medium of the present invention. As the pigment, carbon black or the like may used. The pigment may be added to the aqueous ink together with a dispersant; the pigment may be a self-dispersion type pigment without dispersant; or the pigment may be enclosed in microcapsules.

The water soluble dye is generally used as a solution in water or in a solvent composed of water and a water-soluble organic solvent. The solvent is preferably a mixture of water and a water-soluble organic solvent. More preferably the ink is prepared to contain water at a content ranging from 20% to 90% by weight.

The above water-soluble organic solvent includes alkyl alcohols of 1–4 carbons such as methyl alcohol; amides such as dimethylformamide; ketones and ketone alcohols such as acetone; ethers such as tetrahydrofuran; polyalkylene glycols such as polyethylene glycol; alkylene glycols having an alkylene group of 2–6 carbons such as ethylene glycol; glycerin; and lower alkyl ethers of polyhydric alcohols such as ethylene glycol methyl ether. Of the above water-soluble organic solvent, preferred are polyhydric alcohols such as diethylene glycol; and lower alkyl ethers of a polyhydric alcohol such as triethylene glycol monomethyl ether, and triethylene glycol monoethyl ether. The polyhydric alcohols are particularly preferred since they serve as a lubricant for preventing clogging of the nozzle caused by deposition of the water-soluble dye resulting from evaporation of the water.

A solubilizer may be contained in the ink employed in the present invention. Typical solubilizers are nitrogen-containing heterocyclic ketones. The solubilizer is used for improving remarkably the solubility of the water-soluble dye in the solvent. Examples of the solubilizer, are N-methyl-2-pyrrolidone, and 1,3-dimethyl-2-imidazolidinone. Further improvement of the properties, additives may be added to the ink, the additive including a viscosity-adjusting agent, a surfactant, a surface tension-adjusting agent, a pH-controlling agent, and resistivity-adjusting agent.

An oil-based ink may be used as the ink in the image formation in the present invention. In particular, the image formation method of the present invention is highly effective in image formation by use of a combination of the aforementioned aqueous ink and an oil-based ink. The oil-based ink is a solution or a liquid dispersion of an oil-soluble dye as the coloring matter in an organic solvent, the oil-soluble dye including naphthol dyes, azo dyes, metal complex dyes, anthraquinone dyes, quinoimine dyes, indigo dyes, cyanine dyes, quinoline dyes, nitro dyes, nitroso dyes, benzoquinone dyes, carbonium dyes, naphthoquinone dyes, naphthalimide dyes, phthalocyanine dyes, and perinine dyes. For example, JP-B-7-78187 (the term "JP-B" as used herein means an "examined Japanese patent publication"), JP-B-7-78188, JP-8-6057, and JP-B-8-26259 describe oil-based inks. JP-A-10-250219 describes a dye for an oil-based ink. Of these oil-based dyes, preferred are C.I. Solvent Yellow dyes 3, 14, 16, 33, and 56; C.I. Solvent Red dyes 18, 24, 27, 122, and 135; C.I. Solvent Blue dyes 14, 25, 35, 48, and 108; and C.I. Solvent Black dyes 3, 7, 22, 34, and 50 for the fastness thereof.

The solvent for the oil-based ink is selected to be suitable for the performance of the ink-ejection head of an ink-jet recording apparatus and by considering the safety. Two or more solvents may be used in combination. Typical solvent therefor includes petroleum naphtha solvents such as Pegasol (Mobil Oil Co.), Shell SBR and Shellsol (Shell Oil Co.); aromatic petroleum solvents such as Hisosol (Nippon Oil Co.); aliphatic petroleum solvent such as Soltol (Phillips Oil Co.), Exxosol (Exxon Chemical Co.) Isoper (Exxon Co.), and IP solvent (Idemitsu Petrochemical Co.); naphthene type petroleum solvents such as Ink Solvent (Mitsubishi Oil Co.); aromatic hydrocarbon solvents such as mono- or di-substituted alkylnaphthalenes, alkyl derivatives of biphenyl, xylylethane, and phenethylcumene; alkyl alcohols of 1–4 carbons such as methyl alcohol, ethyl alcohol, n-propyl alcohol, isopropyl alcohol, n-butyl alcohol, s-butyl alcohol, t-butyl alcohol, and isobutyl alcohol; amides such as dimethylformamide, and dimethylacetamide; ketones and ketone alcohols, such as acetone, and diocetone alcohol; ethers such as tetrahydrofuran, and dioxane; polyalkylene glycols such as polyethylene glycol, and polypropylene glycol; alkylene glycols having an alkylene group of 2–6 carbons such as ethylene glycol, propylene glycol, butylene glycol, triethylene glycol, 1,2,6-hexanetriol, thioglycol, hexylene glycol, and diethylene glycol; glycerin; lower alkyl ethers of polyhydric alcohols such as ethylene glycol methyl ether, diethylene glycol methyl (or ethyl) ether, and triethylene glycol monomethyl ether; phosphate esters such as tributyl phosphate, tri-2-ethylhexyl phosphate, triphenyl phosphate, and tricresyl phosphate; phthalate esters such as dimethyl phthalate, diethyl phthalate, dibutyl phthalate, diheptyl phthalate, di-n-octyl phthalate, di-2-ethylhexyl phthalate, diisononyl phthalate, octyl decyl phthalate, and butyl benzyl phthalate; aliphatic monbasic acid esters such as butyl oleate, and glycerin monooleate; aliphatic dibasic acid esters such as dibutyl adipate, di-2-ethylhexyl adipate, alkyl 610 adipate, di-2-ethylhexyl azelate, dibutyl sebacate, and di-2-ethylhexyl sebacate; oxyacid esters such as methyl acetylricinoleate, butyl acetylricinoleate, butylphthalyl butylglycolate, and tributyl acetylcitric acid; plasticizers such as chlorinated paraffin, chlorinated biphenyl, 2-hydrobiphenyl, dinonylnaphthalene, o- and p-toluene sulfone ethylamide, camphor, and methyl abietate.

The oil-based ink containing the aforementioned solvent may contain a polar resin such as polyacrylate esters, linseed oil-modified alkyd resins, polystyrene, rosin resins, terpene-phenol resins, and alkylphenol-modified xylene resins for improvement of storage stability and smearing resistance, or may contain an additive such as a metal-sequestering agent, a surface tension-adjusting agent, a surfactant, a viscosity-adjusting agent, an anti-foaming agent, a foam-suppressing agent, a releasing agent, a foaming agent, a penetrating agent, a fluorescent whitener, a UV-absorbing agent, an antiseptic agent, a water-proofing agent, a rheology-modifier, and an antioxidant.

In image formation in the present invention, ink-jet recording method is preferred in which droplets of the aforementioned water-based or oil-based ink are ejected through a fine orifice to deposit the ink on the recording medium of the present invention. The ink-jet recording system employed therefor may be not limited, provided that the system is capable of discharging the ink effectively through a nozzle to deposit the ink onto the recording medium. In particular, the system disclosed JP-A-54-59936 is effective in which the ink changes its volume abruptly by thermal energy and is ejected by the action of this volume change.

The present invention is described below in more detail without limiting the invention in any way.

EXAMPLE 1

Silica having a BET specific surface area of 270 $m^2/g$ (Fine Sil X-37, Tokuyama Soda Co.) and polyvinyl alcohol (NH-18, Nippon Synthetic Chemical Industry Co.) were missed at a ratio of 5:1 based on the solid matter. The mixture was applied onto a commercial white polyethylene terephthalate sheet, and dried to form an ink-receiving layer of dry solid weight of 20 $g/m^2$. On the formed ink-receiving layer, a 1 wt % solution of 6-ethoxy-1,2-dihydro-2,2,4-trimethylquinoline (Antigen AW, trade name, Sumitomo Chemical Co.) in acetone was applied as the cyclic nitrogen-containing compound in an amount of the above compound of 0.4 $g/m^2$ to obtain a recording medium of the present invention. Table 1 shows the composition of the resulting recording medium.

EXAMPLE 2

An ink-receiving layer having the same composition as that in Example 1 was prepared on the same substrate as in Example 1. On the obtained ink-receiving layer, 2,2,4-trimethyl-1,2-dihydroquinoline polymer (Antigen RD-G, trade name, Sumitomo Chemical Co.) was added as the cyclic nitrogen-containing compound in the same amount and in the same manner as in Example 1 to obtain the recording medium of this Example. Table 1 shows the composition of the resulting recording medium.

EXAMPLE 3

An ink-receiving layer having the same composition as that in Example 1 was prepared on the same substrate as in Example 1. On the obtained ink-receiving layer, a mixture of 6-ethoxy-1,2-dihydro-2,2,4-trimethylquinoline used in Example 1 and 2,2,4-trimethyl-1,2-dihydroquinoline polymer used in Example 2 (mixing ratio 1:1) was added as the cyclic nitrogen-containing compound in the same amount and in the same manner as in Example 1 to obtain the recording medium of this Example. Table 1 shows the composition of the resulting recording medium.

EXAMPLE 4

An ink-receiving layer having the same composition as that in Example 1 was prepared on the same substrate as in Example 1. On the obtained ink-receiving layer, Tinuvin 123 (trade name, Ciba Speciality Co.) was added as the cyclic nitrogen-containing compound in the same amount in the same manner as in Example 1 to obtain the recording medium of this Example. Table 1 shows the composition of the resulting recording medium.

EXAMPLE 5

Alumina hydrate having a BET specific surface area of 270 $m^2/g$ (AS-3, trade name, Catalyst & Chemicals Ind. Co.) and the same polyvinyl alcohol as in Example 1 were mixed at the same ratio as in Example 1. The mixture was applied onto the same substrate as in Example 1 to form an ink-receiving layer of the same amount as in Example 1. On the formed ink-receiving layer, 6-ethoxy-1,2-dihydro-2,2,4-trimethylquinoline was applied as the cyclic nitrogen-containing compound in the same amounts in Example 1 in the same manner as in Example 1 to obtain a recording medium of this Example. Table 1 shows the composition of the resulting recording medium.

EXAMPLE 6

The alumina hydrate used in Example 5 and the polyvinyl alcohol used in Example 1 were mixed at the same ratio as in Example 1. The mixture was applied onto the same substrate as in Example 1 to form an ink-receiving layer of the same amount as in Example 1. On the formed ink-receiving layer, Tinuvin 123 used in Example 4 was applied as the cyclic nitrogen-containing compound in the same amounts in the same manner as in Example 1 to obtain a recording medium of this Example. Table 1 shows the composition of the resulting recording medium.

EXAMPLE 7

Bleached hard wood kraft pulp (LBKP) having a freeness (C.S.F.) of 370 mL (80 parts) and soft wood kraft pulp (NBKP) of freeness of 410 mL (20 parts) were used as the source material pulp. To this source material pulp, were added internally the silica used in Example 1 as the filler in an amount of 10% by weight based on the pulp solid, cationic starch (CATOF, Oji National Co.) as the retention aid in an amount of 0.3% by weight based on the pulp solid. A paper sheet of a basis weight of 75 $g/m^2$ was formed, with addition of a polyacrylamide type retention aid (Pearl Flock FR-X, Seiko Kagaku Kogyo K.K.) in an amount of 0.05% by weight immediately before the sheet formation, by means of a TAPPI standard sheet former. Subsequently, 2% solution of oxidized starch (MS3800, Nippon Shokuhin K.K.) was applied thereon by means of a size press apparatus. Further thereon, 6-ethoxy-1,2-dihydro-2,2,4-trimethylquinoline was applied as the cyclic nitrogen-containing compound in an amount of 0.2 $g/m^2$ in the same manner as in Example 1 to obtain a recording medium of the present invention. Table 1 shows the composition of the resulting recording medium.

EXAMPLE 8

A recording medium of the present invention was prepared in the same manner as in Example 7 except that the silica used in Example 7 was replaced by the alumina hydrate used in Example 6. Table 1 shows the composition of the resulting recording medium.

Evaluation

The recording mediums obtained in Examples 1–8 described above were evaluated for the properties by the methods described below. Table 2 summarizes the evaluation results.

1. Ink Absorbency:

Solid printing was conducted in a single color to four mixed colors with an ink-jet recording apparatus (BJC 430J, Canon Inc.). The formed solid print images were evaluated for the ink absorbency with the evaluation standards below.

The ink absorbency was evaluated by touching the printed portion with a finger to examine the drying state of the ink on the recording medium surface. The standards for the evaluation are as follows. The amount of the ink in single color solid printing was taken as 100%. The recording medium which does not cause sticking of the ink to the finger at the ink amount of 300% (three color mixture) was evaluated to be “Excellent”; the one which does not cause sticking of the ink to the finger at the ink amount of 200% (two color mixture) was evaluated to be “Good”; the one which does not cause sticking of the ink to the finger at the ink amount of 100% was evaluated to be “Fair”; and the one which causes sticking of the ink to the finger at the ink amount of 100% was evaluated to be “Poor”.

2. Image Density:

Solid image prints were formed with single color inks of Y, M, C, Bk on the recording medium at an ink amount of 100%. The density of each of the solid image print portions was measured with a McBeth reflectodensitometer RD-918. The evaluation was made by the image density.

3. Solid Print Uniformity, Feathering, Beading, and Ink Repulsion:

A solid print image was formed in a single color or multiple colors with the same ink-jet recording apparatus as above. The image formed on the surface of the recording medium was examined visually for the solid print uniformity, feathering of the image, beading in the image, and ink repulsion. In evaluation of the solid print uniformity, the recording medium which gives uniform density in the solid print was evaluated “Good”; and the one which caused white blank or density irregularity was evaluated to be “Poor”. In evaluation of the feathering, the recording medium which did not cause running of the coloring matter was evaluated to be “Good”; and the one which caused running of the coloring matter was evaluated to be “Poor”. In evaluation of the beading and ink repulsion, the recording medium which did not cause the beading or ink repulsion was evaluated to be “Good”; and the one which caused it was evaluated to be “Poor”.

4. Yellowing of White Ground by BHT:

An oil-based ink was prepared by mixing and dissolving sufficiently the components below and filtering the mixture through a membrane filter of 0.45 $\mu$m.

(Oil-based Ink)

| | |
|---|---|
| Oil-soluble dye (C.I. Solvent Blue 25) | 6 parts |
| Aliphatic petroleum solvent (IP solvent 1016, Idemitsu Petrochem. Co.) | 60 parts |
| Diisobutyl adipate | 34 parts |

With the above oil-based ink, solid printing (ink amount of 100%) was conducted by means of the ink-jet printer head as above in a print width of 30 mm at the position of 50 mm inside from the peripheral portion. This printed medium was used as a recording medium for yellowing evaluation.

A 1% solution of BHT dimer (4,4'-methylenebis-2,6-di-t-butylphenol) in isopropyl alcohol was spotted on the recording medium sample in an amount corresponding to 0.5 $g/m^2$ as the solid matter, and the recording medium sample was dried in air. The sheets of the recording medium were stored respectively under the conditions of 20° C. and 65% RH or in an oven (DN400, Yamato Kagaku, K.K.) at 35° C. dry for 7 days. Then the color change in the white ground by the storage was examined visually.

The recording medium which did not cause the color change by the storage in either conditions was evaluated to be “Good”; and the one which caused discoloration was evaluated to be “Poor”. Here, the term “dry” means the storage under heating without humidification.

5. Yellowing of White Ground by Holder Storage:

A commercially available clear storage holder (Clear Pocket CL303, Lion Co.) was cut at the upper portion on the one side by 60 mm. The recording medium sample for yellowing evaluation was inserted into this storage holder with the ink-receiving layer face exposed to air at the cut portion of the storage holder. The fibrous material sheet was inserted also in the same manner with the one fact exposed. The storage holder holding the sample sheet was stored under the conditions at 20° C., 65% RH; 35° C. dry; or 50° C. dry, for 30 days. The recording medium which did not cause the color change in the white ground by the storage in the respective conditions was evaluated to be “Good”; and the one which caused discoloration was evaluated to be “Poor”.

6. Ozone Exposure Test for Discoloration and Fading:

Square patterns of 20 mm in side length were printed on the test recording medium with oil-based ink, and aqueous inks (Y, M, C, and Bk) in the named order by means of the some ink-jet recording apparatus as that in the above evaluation. The patterns were formed such that the oil-based ink images and the aqueous ink images were arranged alternately, and the aqueous ink-printed portion was surrounded by the oil-based ink-printed portions. The oil-based ink and the aqueous inks were of a single color respectively, and the solid prints were made with the amount of the inks of 100% respectively. The recording medium having the printed pattern was exposed to 3-ppm ozone at 40° C. and 55% RH for 2 hours in an ozone exposure tester (mode to order, Suga Tester, K.K.). The change in color tone of the printed portions was examined visually. The recording medium which did not cause color tone change was evaluated to be "Good"; and the one which caused color tone change of at least one color was evaluated to be "Poor".

7. Wind Exposure Test for Discoloration and Fading:

The test sample used was the same as that used in the above ozone exposure test, having a printed pattern of oil-based ink images and aqueous ink images arranged alternately. The test sample was placed directly 1 meter below the air outlet of a commercial air conditioner (CY-25Y, Matsusita Electric Ind. Co.) at 20° C. and 65% RH. The air conditioner was driven to blow air to the test sample. After 14 days of the wind exposure test, occurrence of discoloration or fadings was examined visually. The recording medium which did not cause color tone change was evaluated to be "Good"; and the one which caused color tone change of at least one color was evaluated to be "Poor".

8. Storage at High Temperature Environment:

The test sample used was the same as that used in the above ozone exposure test, having a printed pattern of oil-based ink images and aqueous ink images arranged alternately. The test sample was stored under the conditions of 50° C. and 50% RH, or 35° C. dry for 14 days. After the 14-day storage test, the sample was examined visually for occurrence of discoloration or fading. The recording medium which did not cause color tone change was evaluated to be "Good"; and the one which caused color tone change of at least one color was evaluated to "Poor".

9. Powder Falling by Cutting:

The test recording medium was cut into a square of 10 cm in side length. The peripheral portion was examined visually for powder falling. The recording medium which did not cause powder fall was evaluated to be "Good"; and the one which caused powder fall was evaluated to be "Poor".

10. Powder Falling by Folding:

The test recording medium was folded and unfolded at the middle portion repeatedly. The occurrence of powder falling by folding and unfolding was examined visually. The recording medium which did not cause powder falling even at five times of the folding-unfolding was evaluated to be "Good"; the one which did not cause powder falling at three times of the folding-unfolding was evaluated to be "Fair"; and the one which caused powder falling at three or less times of the folding-unfolding was evaluated to be "Poor".

11. Curling:

The test recording medium was cut in a size of 297×210 mm. The cut sample was left standing for 24 hours under any of the conditions of 30° C., 80% RH; 20° C., 45%, RH; 5° C., 10% RH. Thereafter, warpage was measured on a flat table with a height gauge under the respective standing conditions. The recording medium which caused the warpage of not more than 1 mm was evaluated to be "Good"; the one which caused the warpage of not more than 3 mm was evaluated to be "Fair"; and the one which caused the warpage of more than 3 mm was evaluated to be "Poor".

12. Tackiness:

The test recording medium was left standing under any of the conditions of 30° C., 80% RH; 20° C., 45% RH; 5° C., 10% RH for 24 hours. Thereafter, the tackiness was examined by finger touch test under the respective standing conditions. The recording medium which did not cause sticking to the finger by the finger touch was evaluated to be "Good"; and the one which was tacky and caused sticking to the finger was evaluated to be "Poor".

As described above, the present invention provides a recording medium showing the remarkable effects below, and an excellent image forming method and a print by use of this recording medium.

(1) A recording medium is provided in which discoloration or yellowing of the white ground or an unprinted portion of the recording medium is prevented effectively. In particular, even in the recording medium having an image printed with an oil-based ink, discoloration or yellowing of the white ground or an unprinted portion of the recording medium is prevented.

(2) A recording medium is provided which is prevented from natural fading or discoloration of the image (print) formed thereon. In particular, the recording medium on which printing is conducted with an oil-based ink and an aqueous ink together is prevented fading and discoloration of the image even when the recording medium is stored at a high temperature or under wind exposure.

(3) A recording medium is provided which has high ink absorbency, and high color developability, and does not cause feathering, ink repulsion, or beeding.

(4) A recording medium is provided which does not cause curling by change of temperature and the humidity, tackiness of the surface, or powder falling on cutting or folding.

TABLE 1

COMPOSITION OF RECORDING MEDIUMS OF EXAMPLES

| | | | Cyclic nitrogen-containing compound | |
|---|---|---|---|---|
| Example No. | Substrate | Inorganic pigment | Compound | Added amount ($g/m^2$) |
| 1 | White PET sheet | Silica* and PVA** for forming ink-receiving layer | 6-Ethoxy-1,2-dihydro-2,2,4-trimethylquinoline | 0.4 |
| 2 | White PET sheet | Silica and PVA for forming ink-receiving layer | Polymer of 2,2,4-trimethyl-1,2-dihydroquinoline | 0.4 |

TABLE 1-continued

COMPOSITION OF RECORDING MEDIUMS OF EXAMPLES

| Example No. | Substrate | Inorganic pigment | Cyclic nitrogen-containing compound: Compound | Cyclic nitrogen-containing compound: Added amount ($g/m^2$) |
|---|---|---|---|---|
| 3 | White PET sheet | Silica and PVA for forming ink-receiving layer | 6-Ethoxy-1,2-dihydro-2,2,4-trimethylquinoline; and polymer of 2,2,4-trimethyl-1,2-dihydroquinoline (1:1) | 0.4 |
| 4 | White PET sheet | Silica and PVA for forming ink-receiving layer | Tinuvin 123 (trade name, Ciba Specialty Co.) | 0.4 |
| 5 | White PET sheet | Alumina hydrate*** and PVA for forming ink-receiving layer | 6-Ethoxy-1,2-dihydro-2,2,4-trimethylquinoline | 0.4 |
| 6 | White PET sheet | Alumina hydrate and PVA for forming ink-receiving layer | Tinuvin 123 (trade name, Ciba Specialty Co.) | 0.4 |
| 7 | Pulp-made sheet | Silica as filler | 6-Ethoxy-1,2-dihydro-2,2,4-trimethylquinoline | 0.2 |
| 8 | Pulp-made sheet | Alumina hydrate as filler | 6-Ethoxy-1,2-dihydro-2,2,4-trimethylquinoline | 0.2 |

*Silica: BET specific surface area: 270 $m^2/g$
**PVA: Polyvinyl alcohol
***Alumina hydrate: BET specific surface area: 270 $m^2/g$

TABLE 2

RESULTS OF EVALUATION OF RECORDING MEDIUM

| Test item | Example No. 1 | 2 | 3 | 4 | 5 | 6 | 7 | 8 |
|---|---|---|---|---|---|---|---|---|
| Ink Absorbency | Exc* | Exc | Exc | Exc | Exc | Exc | Exc | Exc |
| Image density | | | | | | | | |
| (Bk) | 1.54 | 1.53 | 1.55 | 1.55 | 1.54 | 1.53 | 1.24 | 1.25 |
| (C) | 1.54 | 1.54 | 1.55 | 1.54 | 1.55 | 1.54 | 1.24 | 1.25 |
| (M) | 1.54 | 1.53 | 1.54 | 1.54 | 1.55 | 1.53 | 1.24 | 1.25 |
| (Y) | 1.53 | 1.53 | 1.54 | 1.55 | 1.54 | 1.54 | 1.25 | 1.24 |
| Solid print uniformity | Good | Good | Good | Good | Good | Good | Good | Good |
| Feathering | Good | Good | Good | Good | Good | Good | Good | Good |
| Beading | Good | Good | Good | Good | Good | Good | Good | Good |
| Ink repulsion | Good | Good | Good | Good | Good | Good | Good | Good |
| Yellowing of white ground by BHT | | | | | | | | |
| 20° C./65% | Good | Good | Good | Good | Good | Good | Good | Good |
| 35° C./dry | Good | Good | Good | Good | Good | Good | Good | Good |
| Yellowing storage in storage holder | | | | | | | | |
| 20° C./65% | Good | Good | Good | Good | Good | Good | Good | Good |
| 35° C./dry | Good | Good | Good | Good | Good | Good | Good | Good |
| 50° C./dry | Good | Good | Good | Good | Good | Good | Good | Good |
| Ozone exposure | Good | Good | Good | Good | Good | Good | Good | Good |
| Wind exposure | Good | Good | Good | Good | Good | Good | Good | Good |
| High temperature stoage | | | | | | | | |
| 50° C./50% | Good | Good | Good | Good | Good | Good | Good | Good |
| 35° C./dry | Good | Good | Good | Good | Good | Good | Good | Good |
| Powder falling on cutting | Good | Good | Good | Good | Good | Good | Good | Good |
| Powder falling on folding | Good | Good | Good | Good | Good | Good | Good | Good |
| Curling | | | | | | | | |
| 30° C./80% | Good | Good | Good | Good | Good | Good | Good | Good |
| 20° C./45% | Good | Good | Good | Good | Good | Good | Good | Good |
| 5° C./10% | Good | Good | Good | Good | Good | Good | Good | Good |
| Tackiness | | | | | | | | |
| 30° C./80% | Good | Good | Good | Good | Good | Good | Good | Good |
| 20° C./45% | Good | Good | Good | Good | Good | Good | Good | Good |
| 5° C./10% | Good | Good | Good | Good | Good | Good | Good | Good |

*Exc: Excellent

What is claimed is:

1. A recording medium, comprising one or more of the compounds represented by General Formula (1) or General Formula (2):

(1)

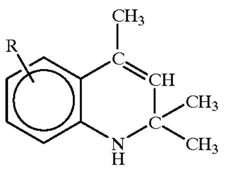

wherein R is any of a hydrogen atom, a substituted or unsubstituted alkoxyl group, a substituted or unsubstituted alkyl group, and a substituted or unsubstituted aryl group;

(2)

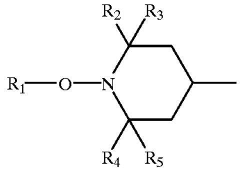

wherein $R_1$ is an alkyl group of 1 of 20 carbons, and $R_2$, $R_3$, $R_4$, and $R_5$ are respectively independently an alkyl group of 1 to 3 carbons, and wherein the recording medium further comprises an inorganic pigment having a BET specific surface area large than 100 $m^2/g$.

2. The recording medium according to claim 1, wherein the group R in General Formula (1) is selected from the group consisting of a hydrogen atom, alkoxy groups of 1 or 2 carbons, alkyl groups, substituted alkyl groups (R'—CONH—R"—, XR"—, HOOC—R"—, R'—NH—R"—, R'—CONH—R"—NH—R'"—(where X is a halogen atom, R' is a hydrogen atom or an alkyl group, R" and R'" are an alkyl group independently)), aryl groups, and substituted aryl groups.

3. The recording medium according to claim 1, wherein the recording medium comprises a substrate and an ink-receiving layer formed on the substrate, and the one or the both of the substrate and the ink-receiving layer contain the compound or compounds represented by General Formula (1) or General Formula (2).

4. An image-forming method of conducting printing by ejecting droplets of an ink onto a recording medium as set forth in any of claims 1, 2 or 3.

5. The image-forming method according to claim 4 wherein the droplets of the ink are ejected by application of thermal energy to the ink.

6. A printed matter having an image formed on the recording medium set forth in any of claims 1, 2 or 3.

* * * * *

UNITED STATES PATENT AND TRADEMARK OFFICE
CERTIFICATE OF CORRECTION

PATENT NO. : 6,391,440 B1
DATED : May 21, 2002
INVENTOR(S) : Hitoshi Yoshino et al.

It is certified that error appears in the above-identified patent and that said Letters Patent is hereby corrected as shown below:

Title page,
Item [57], ABSTRACT,
Line 8, "alkokyl" should read -- alkoxyl --.

Column 2,
Line 5, "as" should read -- as given --.

Column 3,
Line 13, "Further" should read -- Further, --.

Column 4,
Line 41, "provide" should read -- provides --.

Column 8,
Line 7, "Therefore" should read -- Therefore, --.

Column 9,
Line 60, "Multiply" should read -- Multiple --.
Line 61, "multiply" should read -- multiple --.

Column 10,
Line 16, "basic" should read -- basis --.

Column 13,
Line 20, "monbasic" should read -- monobasic --.

Column 17,
Line 40, "to" should read -- to be --.

Column 18,
Line 48, "beeding" should read -- beading --.

UNITED STATES PATENT AND TRADEMARK OFFICE

CERTIFICATE OF CORRECTION

PATENT NO. : 6,391,440 B1
DATED : May 21, 2002
INVENTOR(S) : Hitoshi Yoshino et al.

It is certified that error appears in the above-identified patent and that said Letters Patent is hereby corrected as shown below:

Column 19,
Table 2, "stoage" should read -- storage --.

Column 22,
Line 2, "large" should read -- larger --.
Line 6, "alkoxy" should read -- alkoxyl --.

Signed and Sealed this

Twenty-first Day of October, 2003

JAMES E. ROGAN
*Director of the United States Patent and Trademark Office*